US012493920B2

(12) United States Patent
Gao et al.

(10) Patent No.: US 12,493,920 B2
(45) Date of Patent: Dec. 9, 2025

(54) TECHNIQUES FOR REDUCING VISUAL ARTIFACTS IN FOVEATED RENDERING

(71) Applicant: Meta Platforms Technologies, LLC, Menlo Park, CA (US)

(72) Inventors: Weihua Gao, Santa Clara, CA (US); Todd Douglas Keeler, Magrath (CA); Steven Paul Lansel, Apopka, FL (US); Jian Zhang, Fremont, CA (US); Tianxin Ning, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 228 days.

(21) Appl. No.: 18/162,297

(22) Filed: Jan. 31, 2023

(65) Prior Publication Data

US 2023/0245260 A1 Aug. 3, 2023

Related U.S. Application Data

(60) Provisional application No. 63/305,974, filed on Feb. 2, 2022.

(51) Int. Cl.
*G06T 1/20* (2006.01)
*G06F 3/01* (2006.01)
(Continued)

(52) U.S. Cl.
CPC ............... *G06T 1/20* (2013.01); *G06F 3/013* (2013.01); *G06T 5/70* (2024.01); *G06T 7/11* (2017.01)

(58) Field of Classification Search
CPC ......... G06T 1/20; G06T 15/005; G06T 15/20; G06T 15/503; G06T 15/00; G06T 2210/36; G06F 3/013; G02B 2027/0187
(Continued)

(56) References Cited

U.S. PATENT DOCUMENTS

| 10,504,278 | B1 * | 12/2019 | Hornbeck | G06F 3/013 |
| 2004/0119725 | A1 * | 6/2004 | Li | G06T 11/60 |
| | | | | 345/629 |

(Continued)

OTHER PUBLICATIONS

Open GL Wiki., "Sampler Object," retrieved on Feb. 1, 2023, 3 pages, Retrieved from the Internet: URL: https://www.khronos.org/opengl/wiki/Sampler_Object#LOD_bias.

(Continued)

*Primary Examiner* — Prabodh M Dharia
(74) *Attorney, Agent, or Firm* — Greenberg Traurig, LLP

(57) ABSTRACT

In one embodiment, a method includes by a computing system, rendering an image using a tile-based graphics processing unit. Determining a gaze location of a user wearing a head-mounted device and using the gaze location to select, from the multiple tiles, central tiles in which the user's gaze location is located, periphery tiles outside of the central tiles, and border tiles located between the central tiles and the periphery tiles. Instructing the GPU to render (a) the central tiles in a first pixel-density, (b) the periphery tiles in a second pixel-density, and (c) the border tiles in the first pixel-density and in the second pixel-density and then blending the border tiles rendered in the first pixel-density and the border tiles rendered in the second pixel-density to create blended border tiles. Then, outputting the central tiles, the periphery tiles, and the blended border tiles using a display of the head-mounted device.

20 Claims, 6 Drawing Sheets

(51) Int. Cl.
*G06T 5/70* (2024.01)
*G06T 7/11* (2017.01)

(58) Field of Classification Search
USPC .............................. 345/522, 629; 375/240.26
See application file for complete search history.

(56) References Cited

U.S. PATENT DOCUMENTS

| | | | | |
|---|---|---|---|---|
| 2018/0164592 | A1* | 6/2018 | Lopes | G02B 27/0172 |
| 2018/0295400 | A1* | 10/2018 | Thomas | H04N 21/234327 |
| 2018/0322688 | A1* | 11/2018 | Ozguner | G06T 3/20 |
| 2019/0347763 | A1* | 11/2019 | Goel | G06T 3/053 |
| 2020/0394830 | A1* | 12/2020 | Choubey | G06T 5/77 |
| 2021/0166341 | A1* | 6/2021 | Bastani | G06T 11/00 |
| 2023/0199183 | A1* | 6/2023 | Edpalm | H04N 19/174 |
| | | | | 375/240.26 |

OTHER PUBLICATIONS

Segal M., et al., "The OpenGL® Graphics System: A Specification," Version 4.6 (Core Profile), May 5, 2022, Retrieved from online: https://registry.khronos.org/OpenGL/specs/gl/glspec46.core.pdf#page=255, 851 pages.

Wikipedia., "Mipmap," retrieved on Feb. 1, 2023, 2 pages, Retrieved from the Internet: URL: https://en.wikipedia.org/wiki/Mipmap.

* cited by examiner

TECHNIQUES FOR REDUCING VISUAL ARTIFACTS IN FOVEATED RENDERING

PRIORITY

This application claims the benefit under 35 U. S. C. § 119(e) of U.S. Provisional Patent Application No. 63/305,974, filed 2 Feb. 2022, which is incorporated herein by reference.

TECHNICAL FIELD

This disclosure generally relates to image rendering techniques in Augmented Reality (AR) or Virtual Reality (VR) applications.

BACKGROUND

A mobile computing device—such as a smartphone, tablet computer, or laptop computer, or Augmented Reality/Virtual Reality (AR/VR) headsets—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

Certain mobile devices, such as AR/VR headsets, may face certain practical design constraints which may include the need to minimize power consumption, in-device memory capability and weight restrictions. AR/VR headsets may utilize a mobile graphics processing unit (GPUs) instead of a traditional GPU. Furthermore, AR/VR headsets may utilize graphic rendering techniques such as foveated rendering to reduce the workload of the headset's one or more processing units.

SUMMARY OF PARTICULAR EMBODIMENTS

AR/VR headsets may utilize gaze-based foveated rendering systems to display images to a user wearing the headset. Foveated rendering is a technique which may use an eye tracker integrated into the AR/VR headset to produce an image with higher pixel-density at the center of the user's gaze and lower pixel-density at the periphery. At the same time, AR/VR headsets may utilize mobile GPUs which may be more limited in processing capabilities and process images differently compared to traditional GPUs. For example, mobile GPUs may differ from traditional GPUs in rendering images tile by tile, and mobile GPUs typically render tiles which are larger (e.g., 100×100 pixel tiles) than traditional GPUs (e.g., 4×4 pixel tiles).

When mobile GPUs are utilized in devices which display foveated rendered images, the relatively large size of the rendered tiles may cause the transition between low-pixel-density and high-pixel-density tiles to be very noticeable. In contrast, traditional GPUs render relatively smaller tiles, so foveated rendering on traditional GPUs could simply change the pixel-density of the border tiles gradually and prevent an abrupt and harsh transition between high- and low-pixel-density tiles. Such an abrupt transition from high- and low-pixel-density tiles may cause unpleasant visual artifacts such as a "tunneled" or "windowed" affect and decrease the user's viewing experience.

One solution is to make the transition between the high-pixel-density and low-pixel-density tiles more gradual by blending high- and low-pixel-density border tiles. In one embodiment, this may be accomplished by first taking a rendering of an image from a scene with high-pixel-density tiles at the center of the user's gaze and low-pixel-density tiles at the periphery. Next, a second rendering may be taken, where only the tiles on the inside border of the center of the user's gaze may be rendered and those border tiles are rendered in low pixel-density. The result of taking the first and second renderings in the above disclosed manner is that there are a number of border tiles that have been rendered twice, once in high-pixel-density and once in low-pixel-density. Finally, the two renderings are combined, and the border tiles' pixel-densities are combined and blended so that there is a gradual transition between high-pixel-density and low-pixel-density. The blended border tiles may have a non-uniform pixel-density. Also, a fragment density map (FDM) defining a desired foveation pattern may be utilized in the blending process.

In another embodiment, mipmap texture levels may be manipulated to create a smoother transition between the high-pixel-density and low-pixel-density tiles of a user's gaze. Mipmaps are image textures comprised of a sequence of images where each subsequent image is lower in pixel-density called levels. When rendering objects in 3D, objects that appear closer to the camera are rendered with a lower mipmaps level than objects that are farther away. The solution may be to utilize different mipmap texture levels at the tiles that border the high- and low-pixel-density window of tiles. For the tiles that are in the high-pixel-density region that border low-pixel-density tiles, regions of those tiles per pixel mipmap levels may be purposely downgraded compared to traditional rendering based on the object's distance to create a smooth transition of mipmap levels in the border tiles. This mipmap level downgrading may gradually blend the pixel-densities of the border tiles and help alleviate the window artifact which may appear in foveated rendering. The amount of downgrading may be consistent across the tiles or vary smoothly based on proximity to the high-pixel-density and low-pixel-density.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
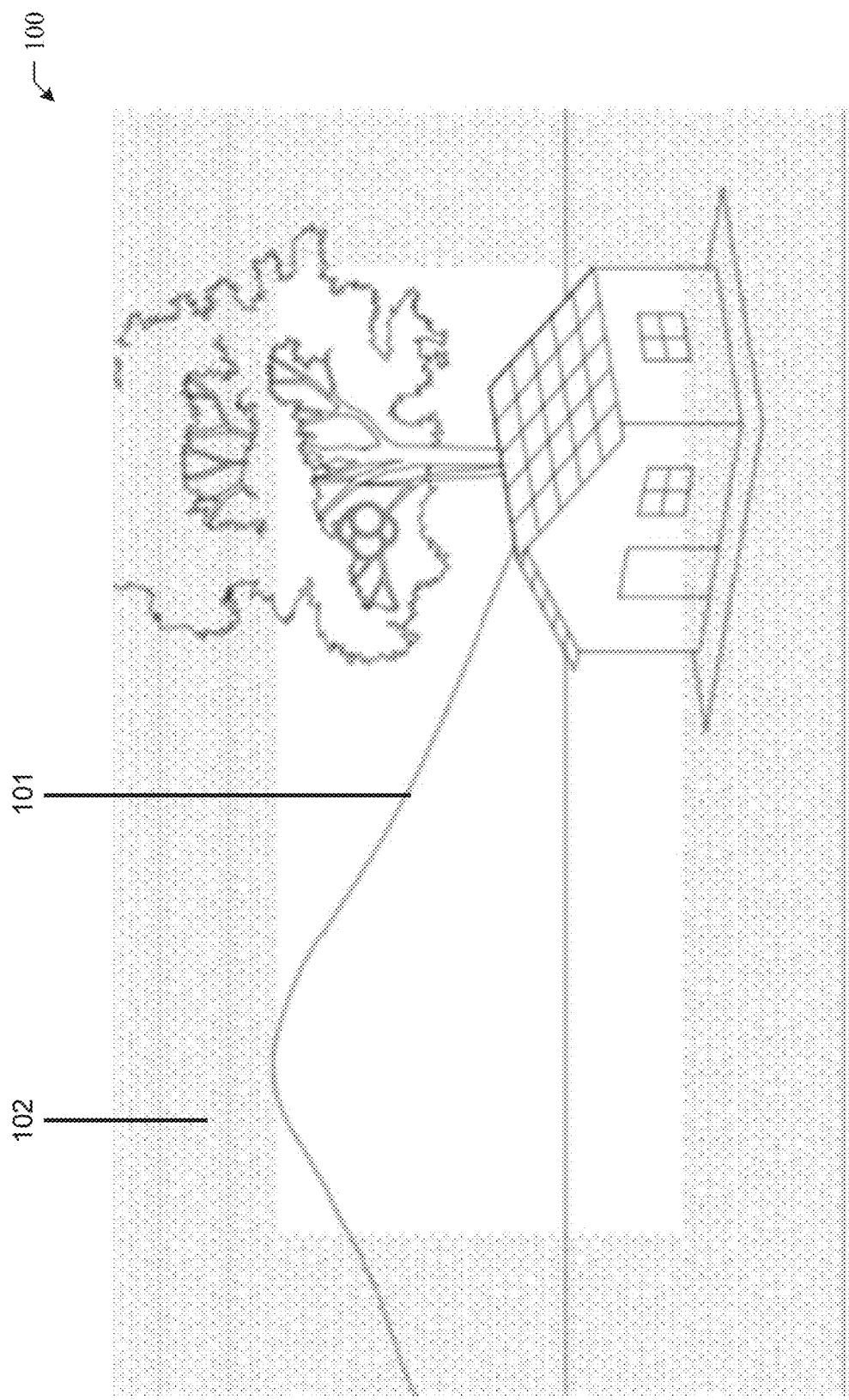
FIG. 1 illustrates an example foveated rendered image from a scene.

FIG. 1 illustrates an example foveated rendered image 100 from a scene. The image 100 may be comprised of a plurality of tiles. In some embodiments, image 100 may be comprised of central tiles 101 which may be located where a user's gaze is located. Image 100 may also be comprised of periphery tiles 102 which may be located outside of where the user's gaze is located. In some embodiments, central tiles 101 may be rendered in a first pixel-density and periphery tiles 102 may be rendered in a second pixel-density. In some embodiments, the first pixel-density may be a higher pixel-density than the second pixel-density. As an example, and not by way of limitation, the transition from the central tiles 101 to the periphery tiles 102 may be abrupt and cause the user to perceive a "window" like visual artifact. The visual artifacts perceived by the user may include "window" or "tunnel" shaped artifacts or any other type of visual artifacts.

Figure 2:
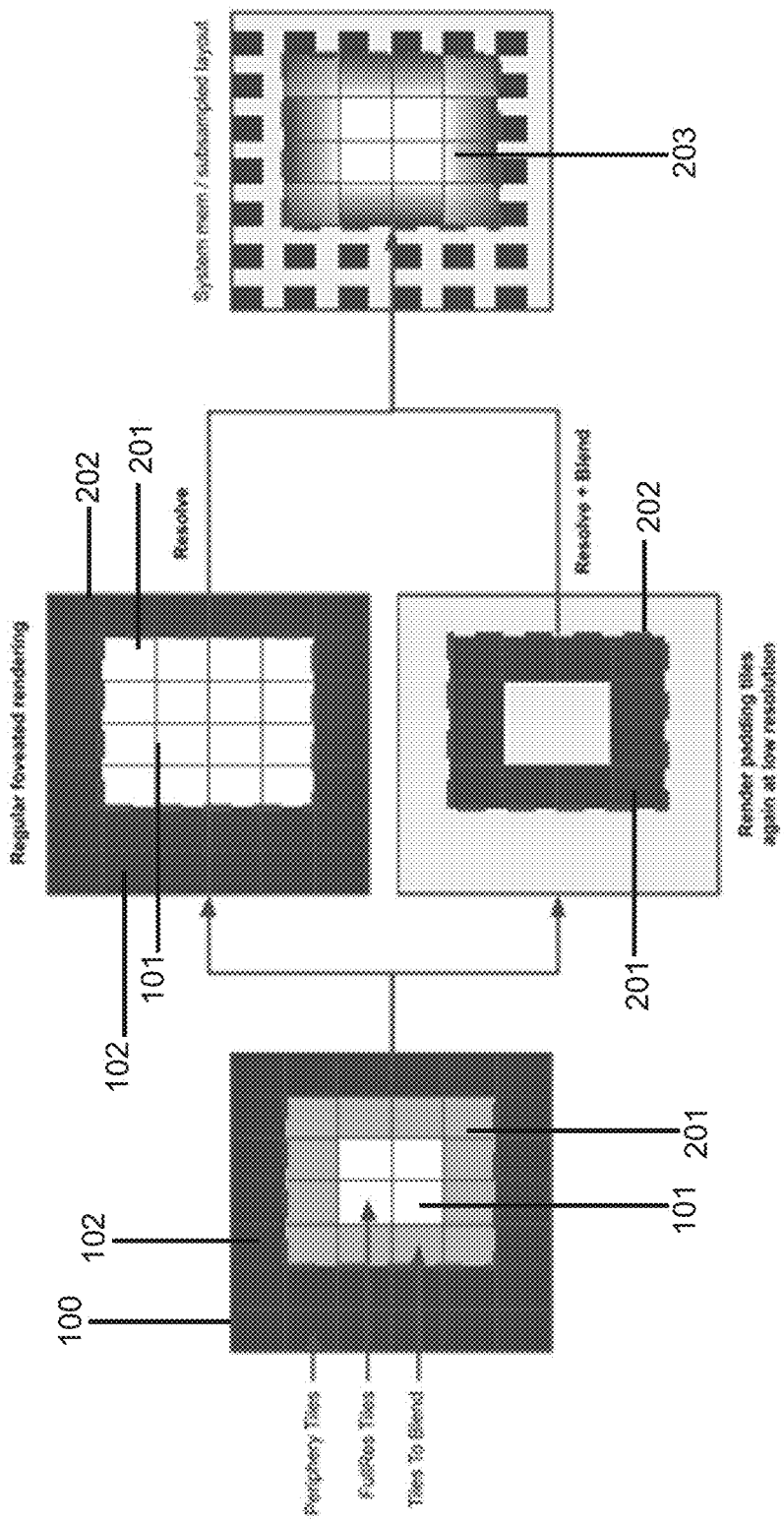
FIG. 2 illustrates an example process of rendering a foveated image.

FIG. 2 illustrates an example process of rendering a foveated image 100. The image 100 may be comprised of a plurality of tiles. In certain embodiments, the gaze location of a user wearing a head-mounted AR/VR immersion device may be determined and using the gaze location, selecting from the plurality of tiles, central tiles 101 in which the user's gaze location is located, periphery tiles 102 outside of the central tiles and border tiles 201 located between the central tiles and the periphery tiles 102. As an example, and not by way of limitation, the user's gaze location may be determined by sensors within the head-mounted device which detect the user's eye movement. In certain embodiments, the GPU may be instructed to take renderings 202 where the central tiles 101 are rendered in a first pixel-density, the periphery tiles 102 are rendered in a second pixel-density and border tiles are rendered in the first and second pixel-density. In certain embodiments, the first pixel-density may be a higher pixel-density than the second pixel-density. In certain embodiments, renderings 202 may be from the same image 100. In certain embodiments, the sensors of the head mounted device may be used to determine a second gaze location of the user and the renderings 202 may be taken utilizing the second gaze location of the user. In certain embodiments, the GPU may be instructed to blend the border tiles 201 rendered in the first pixel-density and the second pixel-density creating blended border tiles 203. In certain embodiments, the blended border tiles 203 may have a pixel-density which is greater than the pixel-density of the periphery tiles but lower than the pixel-density of the central tiles. In certain embodiments, the blended border tiles 203 may be blended in a way such that creates a gradual transition of pixel-density from the central tiles 101 to the periphery tiles 102. In certain embodiments, the blended border tiles 203 may reduce or eliminate visual artifacts perceived by the user between the central tiles 101 and the periphery tiles 102. In certain embodiments, the blending of the border tiles 201 may utilize the second gaze direction of the user wherein the second gaze direction of the user may be determined at a time after the first gaze direction of the user was determined. As an example, and not by way of limitation, the periphery tiles 102 may be rendered first. Next, the user's gaze location may be obtained and the central tiles 101 may be rendered. Then, the border tiles 201 may be blended.

In certain embodiments, the GPU may write the border tiles rendered in the first pixel-density into a memory region before the GPU renders the border tiles in the second pixel-density, wherein the border tiles rendered in the second pixel-density may be blended with the border tiles rendered in the first pixel-density stored in the memory region while the GPU writes the border tiles rendered in the second pixel-density into the memory region. In certain embodiments, the GPU may write the border tiles rendered in the second pixel-density into a memory region before the GPU renders the border tiles in the first pixel-density, wherein the border tiles rendered in the first pixel-density may be blended with the border tiles rendered in the second pixel-density stored in the memory region while the GPU writes the border tiles rendered in the first pixel-density into the memory region.

In certain embodiments, each of the blended border tiles may have a non-uniform pixel-density. Also, each pixel of the blended border tiles may be blended using a blending proportion that depends on a location or distance of the pixel relative to the central tiles or the periphery tiles. In certain embodiments, a second gaze location of the user wearing the head-mounted device may be determined, and where the blended border tiles are blended using at least the second gaze direction of the user. In certain embodiments, a fragment density map defining foveation patterns may be utilized in blending. As an example, and not by way of limitation, the fragment density map may define a gradual degradation of pixel-density relative to the user's gaze location. In certain embodiments, the fragment density map defining a foveation pattern may be accessed, and the border tiles rendered in the first pixel-density and the border tiles rendered in the second pixel-density may be blended based on the fragment density map and the user's gaze location. This may result in a smooth blend of pixel-densities which may adhere to the desired foveation pattern.

In certain embodiments, a single rendering may be taken wherein the central tiles 101 and border tiles 201 are rendered in the first pixel-density and the periphery tiles 102 may be rendered in the second pixel-density and where mipmap textures of the border tiles 201 may be downgraded gradually to create a smooth transition of pixel-density from the central tiles 101 to the periphery tiles 102. In certain embodiments, the downgraded mipmap textures of border tiles 201 may reduce or eliminate visual artifacts between the central tiles 101 and the periphery tiles 102.

Figure 3:
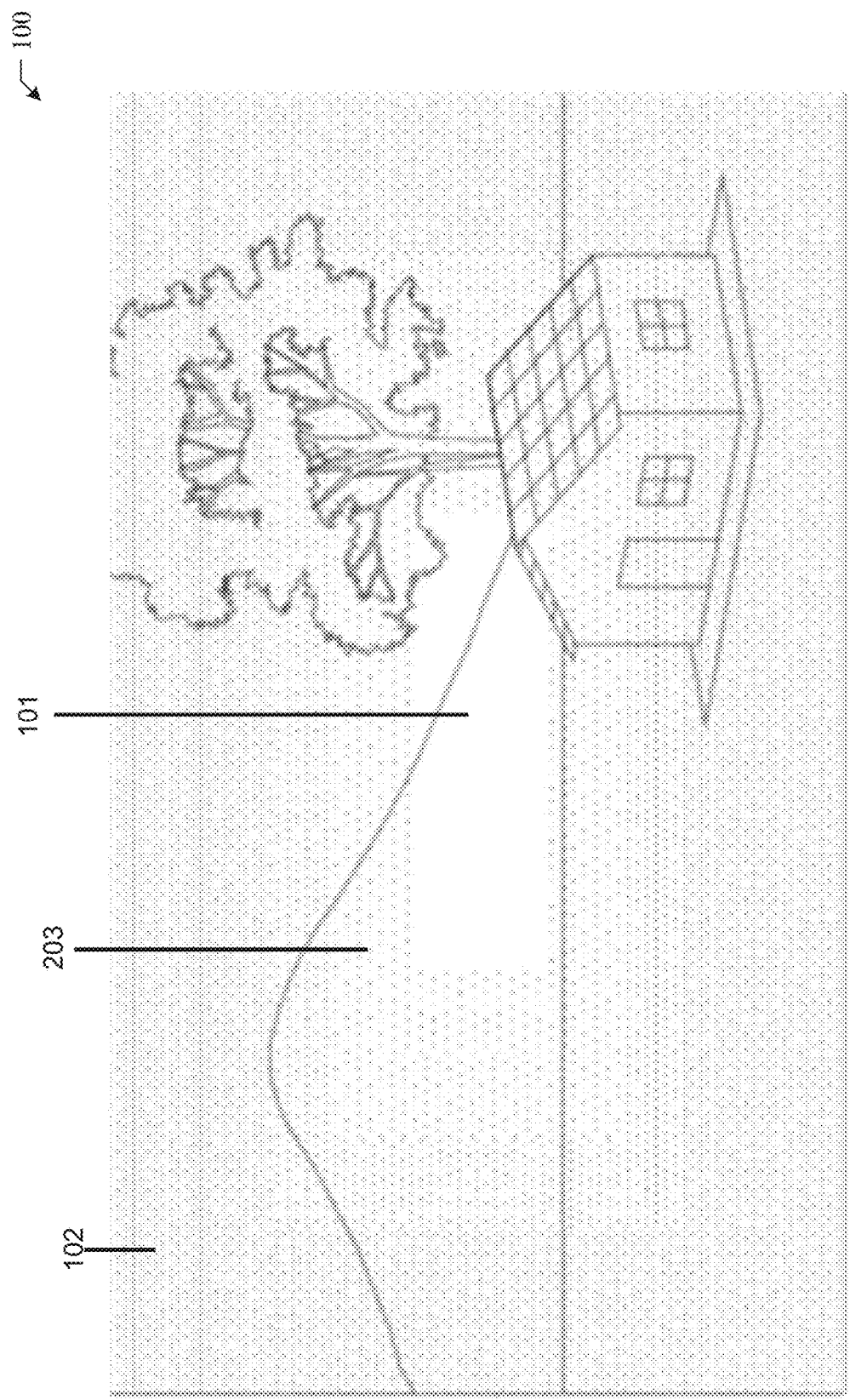
FIG. 3 illustrates another example foveated rendered image.

FIG. 3 illustrates another example foveated rendered image 100. The image 100 may be comprised of a plurality of tiles. In certain embodiments, the image 100 may be generated from a head-mounted device. As an example, and not by way of limitation, the head-mounted device may be used in an AR/VR application. In certain embodiments, the GPU of the head-mounted device may be instructed to render the central tiles 101 in the first pixel-density, the periphery tiles 102 in the second pixel-density, and the border tiles in the first and second pixel-density. In certain embodiments, the first pixel-density may be higher pixel-density than the second pixel-density. In certain embodiments, the GPU may blend the border tiles rendered in the first pixel-density and the border tiles rendered in the second pixel-density to create blended border tiles 203. In certain embodiments, each pixel of the blended border tiles may be blended using the blending proportion that depends on a location or distance of the pixel relative to the central tiles or the periphery tiles. In certain embodiments, the fragment density map defining a foveation pattern may be accessed where the border tiles rendered in the first pixel-density and the border tiles rendered in the second pixel-density are blended based on the fragment density map and the user's gaze location. In certain embodiments, the blended border tiles 203 may be blended in a way such that creates a gradual transition of pixel-density from the central tiles 101 to the periphery tiles 102. In certain embodiments, the blended border tiles 203 may reduce or eliminate visual artifacts perceived by the user between the central tiles 101 and the periphery tiles 102.

In particular embodiments, blending may be achieved via mipmap biasing. Mip-mapping is a process by which raster pipeline samples from successively lower pixel-densities of an image texture coloring a 3D object to fill in the pixel being drawn on the screen. The primary goal may be to maintain relative equality between the size of the pixel with the projected texel; as objects retreat into the distance, lower pixel-density textures are used to maintain this equality. The process to construct this hierarchy of texture pixel-densities is usually automated and may consist of recursively down-sampling the image by one half, to create a full mipmap. This may also be done manually by providing pre-made mipmap levels to the render pipeline. Because Variable Rate Shading may cause the pixel size to jump discontinuously across tile boundaries, the mipmap sampling may also jump. High-frequency textures that have been mipmapped may exhibit serious visual differences between levels, which allows the transition between tile pixel-densities to be discernable.

In particular embodiments, the mipmap level that the raster pipeline samples may be defined by a Level of Detail (LOD) bias. LOD biases come from hardware rasterizer based on geometry and initial pixel size. The hardware bias is correct to specification, which states that the bias level is defined to match the projected texel to have an approximate dimension as the screen pixel size. Reducing the hardware bias for any tile will result in subsampling the texture and lead to flickering when the texture includes relatively high frequencies. While the hardware mipmap bias is dependent on geometry position and orientation, the jump in bias level between tiles is independent of such, as long as there is an equivalent jump in pixel size for both the x and y axes. Otherwise, the texel-to-pixel projection hardware bias level jump can change per triangle when reducing pixel pixel-density along a single x or y-axis.

One way to mitigate this may be to degrade the higher-level biases in a linear blend to meet adjacent low-pixel-density tiles. This needs to be done in shader code after the hardware biases have been calculated in the raster pipeline, and the shader needs to know adjacency information. It may be plausible to inject this in byte code, or have it done implicitly at shader compile time using adjacency information. As an example, and not by way of limitation, one other alternative, which may eliminate the need for adjacency information, is to maintain a screen-wide radial mipmap bias function F, which is dependent on a focus input. To maintain a smooth bias falloff, the radial bias function may be added to the hardware-provided bias. When switching to coarser tiles, one would subtract the extra jump in the hardware bias, easily calculated per tile via derivatives, or provided intrinsically per tile; this would maintain a continuous mipmap bias function across the whole scene. Specifically, the global radius may be HWB+F(r)−J. Subsampling for each tile would be implicitly avoided by the radial function's rate of increase, informed by the GL function controlling the tile pixel-density levels. The shader may need to have access to the focal point, but adjacency information would not be required.

In particular embodiments, the border tiles 201, such as those shown in FIG. 2, may be blended using a mipmap level bias. As an example and not by way of limitation, let's assume mipmap level 1 (highest pixel-density) is chosen in full pixel-density, and mipmap level 3 (4×4 downsampled) is chosen in ¼ pixel-density. Now the issue is that there is a sharp mipmap level jump at the border of the full-pixel-density tiles and the ¼-pixel-density tiles (not continuous), which may result in a noticeable border. On the full-pixel-density side, everything may be sharp; and on the ¼-pixel-density side, everything may be blurry.

In particular embodiments, the blending process may be illustrated using the following example. For a border tile within the border tiles 201, within the distance of 10 pixels to the border of a full-pixel-density tile, the rendering system may gradually increase the mipmap level from a higher level 1 (e.g., a higher pixel-density mipmap level, such as full pixel-density) to a lower level 3 (e.g., ¼ pixel-density). The mipmap levels selected for the 10 pixels may transition gradually or continuously from level 1 to level 3. For example, if pixel 1 is closer to the full-pixel-density tile and pixel 10 is farther away, then the mipmap levels selected for pixels 1 to 10 could be, for example, floating-point mipmap levels 1.2, 1.4, 1.5, 1.6, 1.8, 2, 2.2, 2.5, 2.7, 2.9, respectively. Mipmap level 1.2 may be obtained via a trilinear sampling of mipmap levels 1 and 2; mipmap level 2.7 may be obtained via a trilinear sampling of mipmap levels 2 and 3, for example. The GPU may automatically select the appropriate level based on the scene geometry and the desired Level of Detail (LOD).

In particular embodiments, the gradual transition between mipmap levels in the region where blending is desired (e.g., the entire span of the border tile 201 or a partial portion of the border tile 201) may be specified via a LOD bias. The LOD bias setting for a tile being rendered may be specified at a sub-tile level (e.g., it may be specified at a per-pixel level or per-patch level). For example, for the aforementioned pixels 1 to 10, the LOD (assuming higher LOD means a higher level of detail) bias may be −0.1, −0.3, −0.5, −0.7, −0.9, −1.2, −1.4, −1.6, −1.8, −2.0, respectively. The specified LOD bias would cause the GPU to select a gradual transition of mipmap levels when rendering those pixels.

Figure 4:
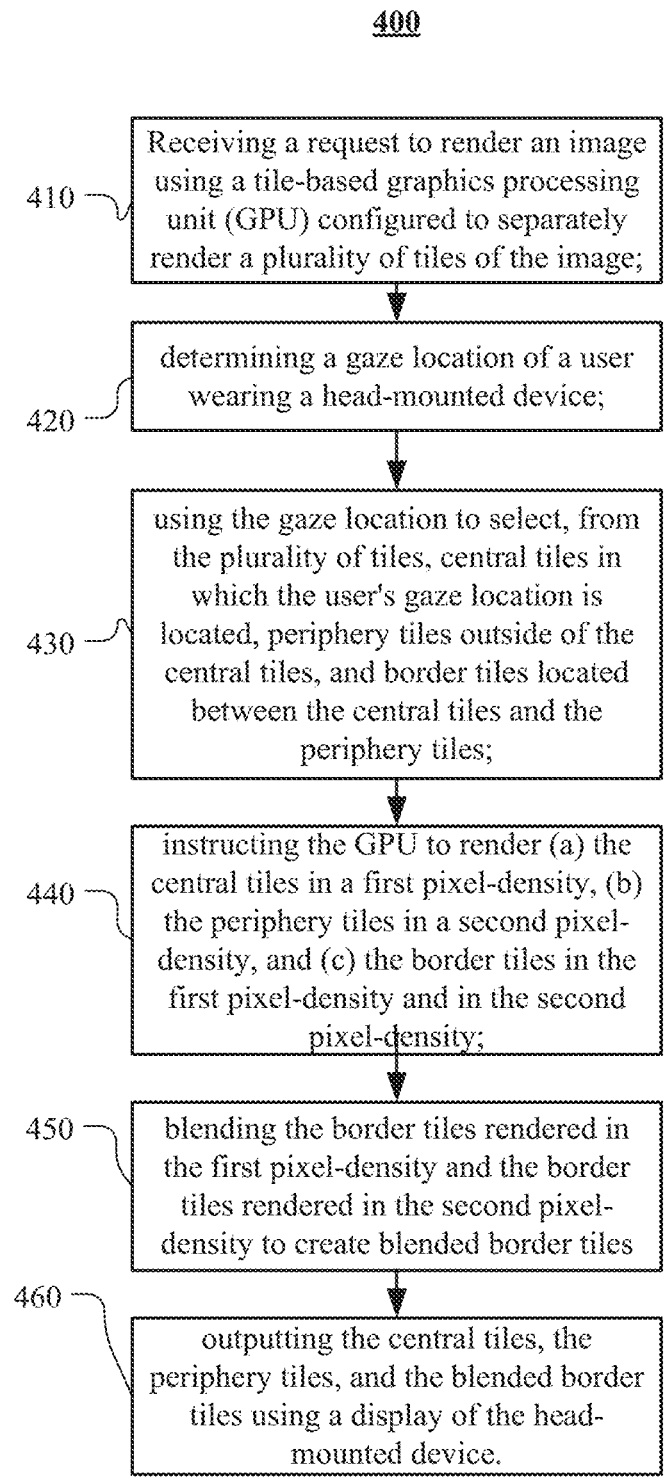
FIG. 4 illustrates an example method for reducing visual artifacts in foveated rendering.

FIG. 4 illustrates an example method 400 for reducing visual artifacts in foveated rendering. The method may begin at step 410, where a computing system may receive a request to render an image using a tile-based graphics processing unit (GPU) configured to separately render a plurality of tiles of the image. At step 420, determining a gaze location of a user wearing a head-mounted device. At step 430, using the gaze location to select, from the plurality of tiles, central tiles in which the user's gaze location is located, periphery tiles outside of the central tiles, and border tiles located between the central tiles and the periphery tiles. At step 440, instructing the GPU to render (a) the central tiles in a first pixel-density, (b) the periphery tiles in a second pixel-density, and (c) the border tiles in the first pixel-density and in the second pixel-density. At step 450, blending the border tiles rendered in the first pixel-density and the border tiles rendered in the second pixel-density to create blended border tiles. At step 460, outputting the central tiles, the periphery tiles, and the blended border tiles using a display of the head-mounted device. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for reducing visual artifacts in foveated rendering including the particular steps of the method of FIG. 4, this disclosure contemplates any suitable method for reducing visual artifacts in foveated rendering including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
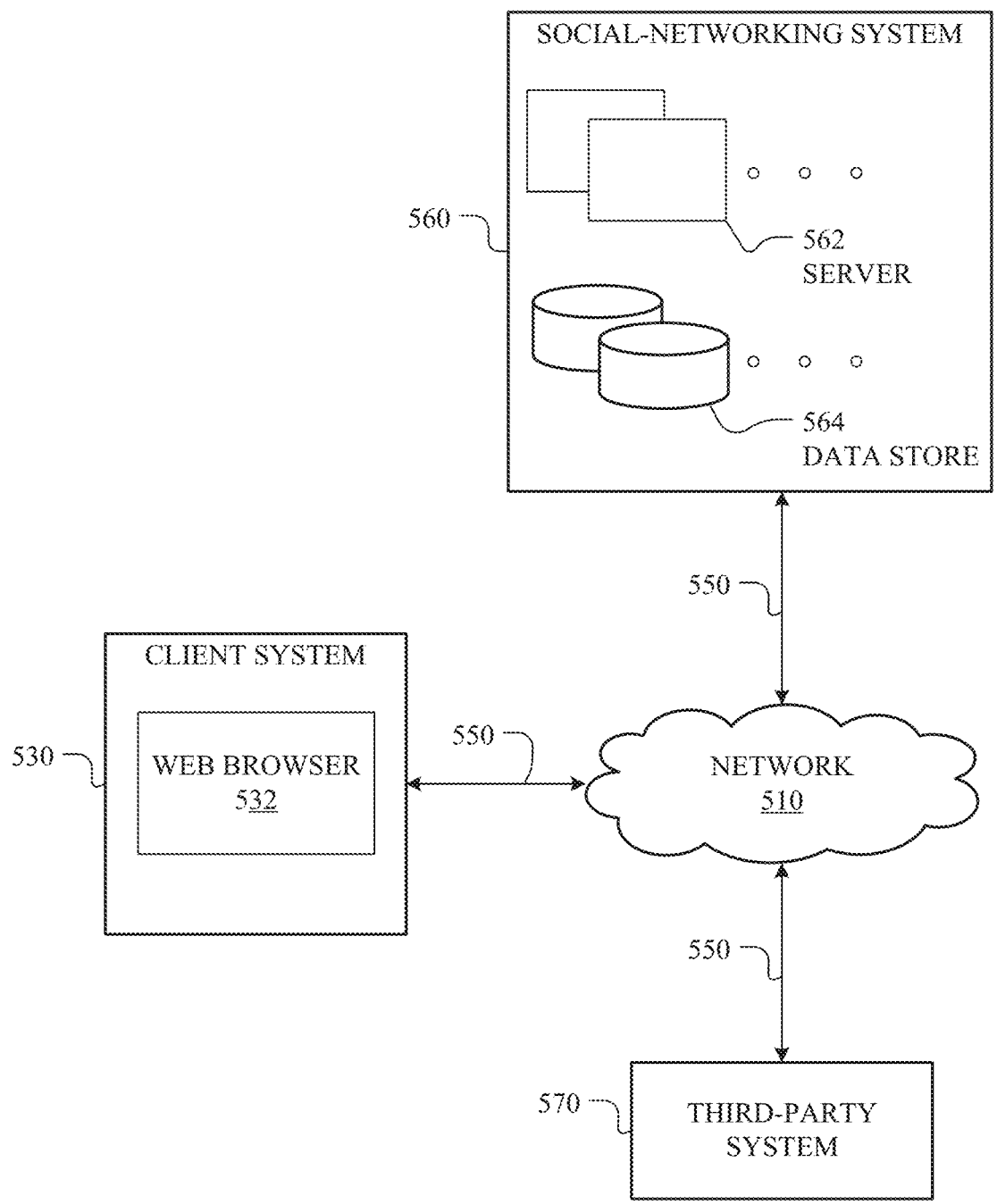
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, and may have one or more add-ons, plug-ins, or other extensions. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 560). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 560 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 560) or RSVP (e.g., through social-networking system 560) to an event associated with the advertisement. In addition or as an alternative, an advertisement may include social-networking-system content directed to the user. As an example and not by way of limitation, an advertisement may display information about a friend of the user within social-networking system 560 who has taken an action associated with the subject matter of the advertisement.

Figure 6:
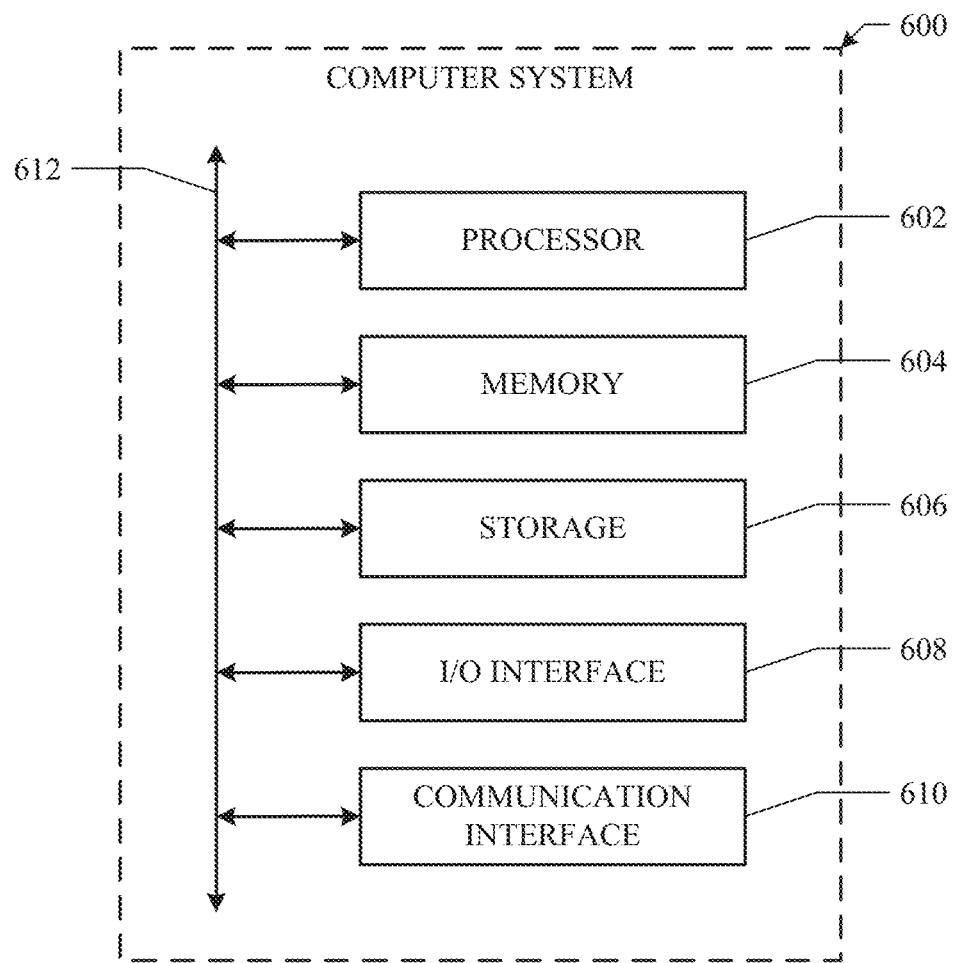
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A method comprising, by a computing system:
 receiving a request to render an image using a tile-based graphics processing unit (GPU) configured to separately render a plurality of tiles of the image;

determining a gaze location of a user wearing a head-mounted device;

using the gaze location to select, from the plurality of tiles, central tiles in which the user's gaze location is located, periphery tiles outside of the central tiles, and border tiles located between the central tiles and the periphery tiles;

instructing the GPU to render (a) the central tiles in a first pixel-density, (b) the periphery tiles in a second pixel-density, and (c) the border tiles in the first pixel-density and in the second pixel-density;

blending the border tiles rendered in the first pixel-density and the border tiles rendered in the second pixel-density to create blended border tiles, wherein one or more pixels of the blended border tiles are blended using a specified blending proportion that depends on a location or distance of each pixel relative to the central tiles or the periphery tiles, wherein the specified blending proportion incorporates a first amount of pixels at the first pixel-density relative to a second amount of pixels at the second pixel-density according to the location or distance of each pixel relative to the central tiles or the periphery tiles; and outputting the central tiles, the periphery tiles, and the blended border tiles using a display of the head-mounted device.

2. The method of claim 1, wherein the GPU writes the border tiles rendered in the first pixel-density into a memory region before the GPU renders the border tiles in the second pixel-density, wherein the border tiles rendered in the second pixel-density are blended with the border tiles rendered in the first pixel-density stored in the memory region while the GPU writes the border tiles rendered in the second pixel-density into the memory region.

3. The method of claim 1, wherein the GPU writes the border tiles rendered in the second pixel-density into a memory region before the GPU renders the border tiles in the first pixel-density, wherein the border tiles rendered in the first pixel-density are blended with the border tiles rendered in the second pixel-density stored in the memory region while the GPU writes the border tiles rendered in the first pixel-density into the memory region.

4. The method of claim 1, wherein the first pixel-density is a higher pixel-density than the second pixel-density.

5. The method of claim 1, wherein the blended border tiles have a pixel-density which is greater than the pixel-density of the periphery tiles but lower than the pixel-density of the central tiles.

6. The method of claim 1, wherein each of the blended border tiles has a non-uniform pixel-density.

7. The method of claim 1, wherein each pixel of the blended border tiles is blended using a blending proportion that depends on a location or distance of the pixel relative to the central tiles or the periphery tiles.

8. The method of claim 1, further comprising: determining a second gaze location of the user wearing the head-mounted device, wherein the blended border tiles are blended using at least the second gaze direction of the user.

9. The method of claim 1, further comprising:
accessing a fragment density map defining a foveation pattern, wherein the border tiles rendered in the first pixel-density and the border tiles rendered in the second pixel-density are blended based on the fragment density map and the user's gaze location.

10. One or more computer-readable non-transitory storage media embodying software that is operable when executed to:

receive a request to render an image using a tile-based graphics processing unit (GPU) configured to separately render a plurality of tiles of the image;

determine a gaze location of a user wearing a head-mounted device;

use the gaze location to select, from the plurality of tiles, central tiles in which the user's gaze location is located, periphery tiles outside of the central tiles, and border tiles located between the central tiles and the periphery tiles;

instruct the GPU to render (a) the central tiles in a first pixel-density, (b) the periphery tiles in a second pixel-density, and (c) the border tiles in the first pixel-density and in the second pixel-density;

blend the border tiles rendered in the first pixel-density and the border tiles rendered in the second pixel-density to create blended border tiles, wherein one or more pixels of the blended border tiles are blended using a specified blending proportion that depends on a location or distance of each pixel relative to the central tiles or the periphery tiles, wherein the specified blending proportion incorporates a first amount of pixels at the first pixel-density relative to a second amount of pixels at the second pixel-density according to the location or distance of each pixel relative to the central tiles or the periphery tiles; and output the central tiles, the periphery tiles, and the blended border tiles using a display of the head-mounted device.

11. The media of claim 10, wherein the GPU writes the border tiles rendered in the first pixel-density into a memory region before the GPU renders the border tiles in the second pixel-density, wherein the border tiles rendered in the second pixel-density are blended with the border tiles rendered in the first pixel-density stored in the memory region while the GPU writes the border tiles rendered in the second pixel-density into the memory region.

12. The media of claim 10, wherein the first pixel-density is a higher pixel-density than the second pixel-density.

13. The media of claim 10, wherein each of the blended border tiles has a non-uniform pixel-density.

14. The media of claim 10, wherein each pixel of the blended border tiles is blended using a blending proportion that depends on a location or distance of the pixel relative to the central tiles or the periphery tiles.

15. The media of claim 10, further comprising:
access a fragment density map defining a foveation pattern, wherein the border tiles rendered in the first pixel-density and the border tiles rendered in the second pixel-density are blended based on the fragment density map and the user's gaze location.

16. A system comprising:
one or more processors; and
one or more computer-readable non-transitory storage media coupled to one or more of the processors and comprising instructions operable when executed by one or more of the processors to cause the system to:
receive a request to render an image using a tile-based graphics processing unit (GPU) configured to separately render a plurality of tiles of the image;
determine a gaze location of a user wearing a head-mounted device;
use the gaze location to select, from the plurality of tiles, central tiles in which the user's gaze location is located, periphery tiles outside of the central tiles, and border tiles located between the central tiles and the periphery tiles;

instruct the GPU to render (a) the central tiles in a first pixel-density, (b) the periphery tiles in a second pixel-density, and (c) the border tiles in the first pixel-density and in the second pixel-density;

blend the border tiles rendered in the first pixel-density and the border tiles rendered in the second pixel-density to create blended border tiles, wherein one or more pixels of the blended border tiles are blended using a specified blending proportion that depends on a location or distance of each pixel relative to the central tiles or the periphery tiles, wherein the specified blending proportion incorporates a first amount of pixels at the first pixel-density relative to a second amount of pixels at the second pixel-density according to the location or distance of each pixel relative to the central tiles or the periphery tiles; and output the central tiles, the periphery tiles, and the blended border tiles using a display of the head-mounted device.

17. The system of claim 16, wherein the first pixel-density is a higher pixel-density than the second pixel-density.

18. The system of claim 16, wherein each of the blended border tiles has a non-uniform pixel-density.

19. The system of claim 16, wherein the GPU writes the border tiles rendered in the first pixel-density into a memory region before the GPU renders the border tiles in the second pixel-density, wherein the border tiles rendered in the second pixel-density is blended with the border tiles rendered in the first pixel-density stored in the memory region while the GPU writes the border tiles rendered in the second pixel-density into the memory region.

20. The system of claim 16, further comprising:

access a fragment density map defining a foveation pattern, wherein the border tiles rendered in the first pixel-density and the border tiles rendered in the second pixel-density are blended based on the fragment density map and the user's gaze location.

* * * * *